(12) United States Patent
Adrian et al.

(10) Patent No.: US 6,314,272 B1
(45) Date of Patent: Nov. 6, 2001

(54) RADIO FREQUENCY BROADCAST SYSTEM FOR ENCLOSED SPACES

(75) Inventors: Andrew Adrian, Dexter; Bruce Robert Jones, Romulus; Dilip K. Pithadia, Farmington Hills; Joseph Michael Huk, Southfield; Tamara Jean Nordstrom, Bloomfield Hills; Robert Arnold Schuessler, Canton, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/070,236

(22) Filed: Apr. 30, 1998

(51) Int. Cl.$^7$ ........................................ H04B 3/46
(52) U.S. Cl. ..................... 455/67.2; 455/14; 455/17; 455/41; 455/523; 343/703
(58) Field of Search ................ 455/67.2, 67.4, 455/7, 11.1, 14, 17, 19, 523, 115, 129, 142, 226.1, 41, 93, 103; 343/703, 825, 841, 905; 333/33, 134, 136; 324/95; 381/58; 375/211, 224

(56) References Cited

U.S. PATENT DOCUMENTS

| | | | |
|---|---|---|---|
| 3,423,681 | * | 1/1969 | McKenna .............................. 455/129 |
| 3,585,505 | * | 6/1971 | Oglivy ................................... 455/41 |
| 3,665,507 | * | 5/1972 | Peil ...................................... 455/142 |
| 4,232,319 | * | 11/1980 | Fusinski .............................. 343/703 |
| 5,230,085 | * | 7/1993 | Loposer ............................... 455/41 |

* cited by examiner

*Primary Examiner*—Lester G. Kincaid
(74) *Attorney, Agent, or Firm*—Larry I. Shelton

(57) ABSTRACT

Uniform and concentrated radio broadcast signals are obtained employing an antenna structure which uses separate antenna conductors on opposite sides of a radio reception area. The antenna conductors perform similarly to the plates of a capacitor. Highly efficient antenna performance results. In a preferred embodiment wherein the antennas are used for radio testing inside a vehicle assembly plant, the track or carrier structure of the vehicle assembly line provides one of the antenna conductors.

4 Claims, 4 Drawing Sheets

RADIO FREQUENCY BROADCAST SYSTEM FOR ENCLOSED SPACES

BACKGROUND OF THE INVENTION

The present invention relates in general to broadcasting radio frequency signals to an enclosed area, and more specifically, to providing radio broadcast signals having a concentrated intensity which are particularly useful in testing radio systems during their installation into vehicles on an assembly line.

Wireless broadcasting from radio towers, such as in standard AM and FM broadcasting, transmits radio frequency (RF) signals through the air to individual receivers. The RF signals have a limited ability to penetrate into tunnels, buildings, and other structures. Receivers in these locations may be unable to receive a usable signal. Therefore, rebroadcast systems are used which employ an external antenna on the outside of the building and transmission-line wiring (possibly including an amplifier) for bringing RF signals inside the building without attenuation and then rebroadcasting with an internal antenna to receivers located in the structure.

It may also be desirable to provide only an internal antenna for a system broadcasting dedicated signals within a structure. In other words, the source signal for such a broadcasting system need not be externally derived radio broadcast signals. Nevertheless, in any such a system, it is important to restrict broadcast of signals to be within the structure and minimize external radiation which could interfere with other broadcasts outside the structure.

One application of rebroadcast type systems is in the testing of radio receivers and audio systems in automobile manufacturing plants. During manufacture of an automobile, antenna connections and speaker connections to the audio system must be checked. In a typical process, after installation of the radio and all of its interconnections, the radio is powered up and an operator presses the seek button to perform a seek tuning operation which stops at a received broadcast station of sufficient strength. If the radio fails to stop at any frequency (even though a sufficiently strong broadcast signal is present), then the antenna connection needs to be checked. Once a station is received, the audio is played through the speakers so that each speaker may be listened to, thereby permitting its speaker connections and proper operation to be verified (this process is often referred to as a speaker "walkaround" test).

A test area for performing these checks is typically inside a large building having a large amount of metal structure which results in highly attenuated RF signals penetrating the building. Furthermore, during the vehicle manufacturing process, a full radio antenna is typically not installed. In order to avoid antenna breakage during shipping of vehicles to their point of sale, only the antenna stub or base is present during manufacture. The full whip antenna is installed after shipping of the vehicle (e.g., at the dealer). Since only a partial antenna is present, the radio is even less sensitive to RF signals.

Typical rebroadcast systems in a building use a long-wire antenna inside the building which spreads the broadcast RF signals over a large area and fails to provide uniform transmission fields. Therefore, typical broadcast systems have had difficulty providing sufficient field strength for testing of radio systems in vehicle assembly plants. Furthermore, the exact location of radio testing on a vehicle assembly line may change from time to time, which may lead to problems due to the lack of uniformity in the broadcast field.

SUMMARY OF THE INVENTION

The present invention has the advantage of providing a concentrated RF radio broadcast signal in an enclosed space, such as a test area inside a vehicle assembly plant, with a simple inexpensive antenna structure.

More specifically, the invention provides a broadcast system for broadcasting signals in an enclosed space to a radio reception area. A first antenna conductor forms a first emission surface along a side of the radio reception area. A second antenna conductor forms a second emission surface along an opposite side of the radio reception area. An RF amplifier is coupled across the first and second antenna conductors to produce concentrated RF radio broadcast signal between the first and second emission surfaces and in the radio reception area. The first and second antenna conductors act like two plates of a capacitor which concentrates the electric field in the area between the plates.

DETAILED DESCRIPTION OF PREFERRED EMBODIMENTS

Figure 1:
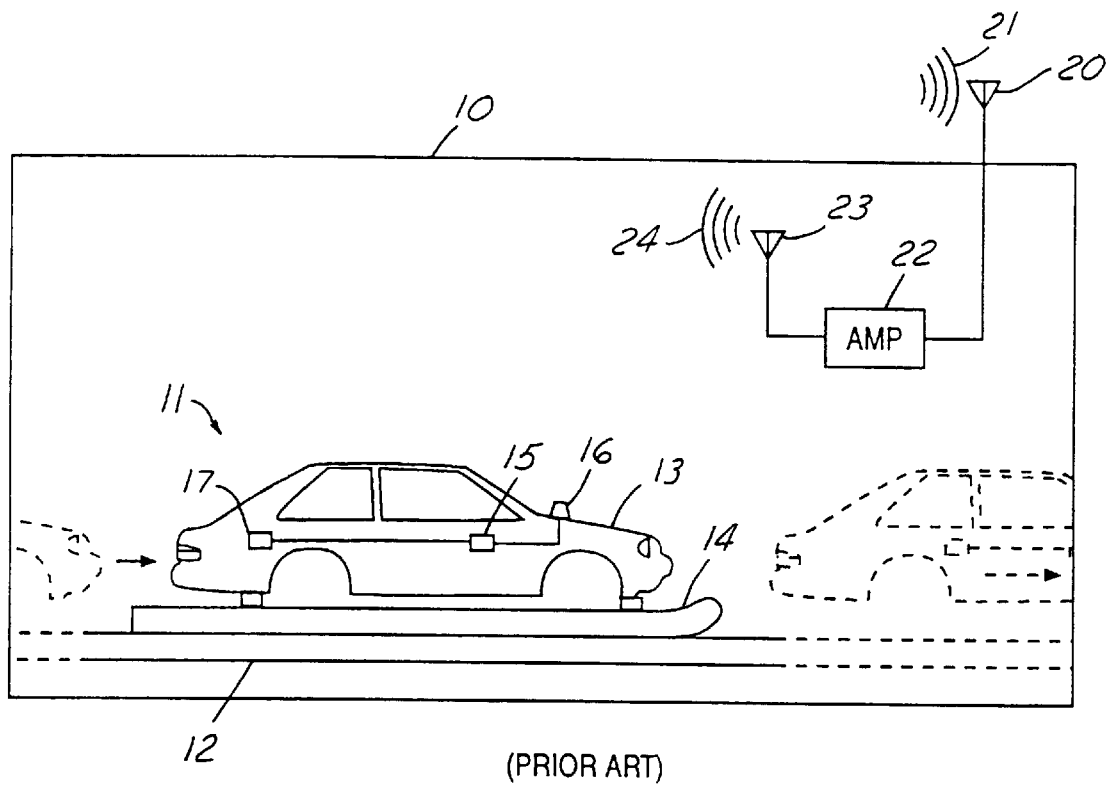
FIG. 1 is a schematic diagram showing a rebroadcast system in a vehicle assembly plant.

FIG. 1 shows a vehicle manufacturing building 10 including a vehicle assembly line 11. A rail or track 12 moves vehicles along at least a portion of the assembly line. In particular, a vehicle 13 supported by a fixture or sled 14 is pulled along track 12. At the point shown in FIG. 1, vehicle 13 already has an audio system and electrical system installed, including a radio 15, an antenna stub 16, speakers 17, and wiring to connect these three components. In some assembly plants, radio testing might not be performed until a vehicle actually has wheels and is rolling.

An external antenna 20 mounted outside vehicle manufacturing building 10 receives RF broadcast signals 21 from transmitting towers over the local geographic region. RF signals 21 picked up by antenna 20 are amplified by an amplifier 22 and are rebroadcast inside vehicle manufacturing building 10 by an internal antenna 23. The resulting RF broadcast signals 24 are transmitted in the vicinity of vehicle 13 during radio testing. However, since broadcast signals 24 are not well controlled, a relatively large amount of power may be necessary in order to provide sufficient field strength for reliable testing of radio 15 and its interconnections.

Figure 2:
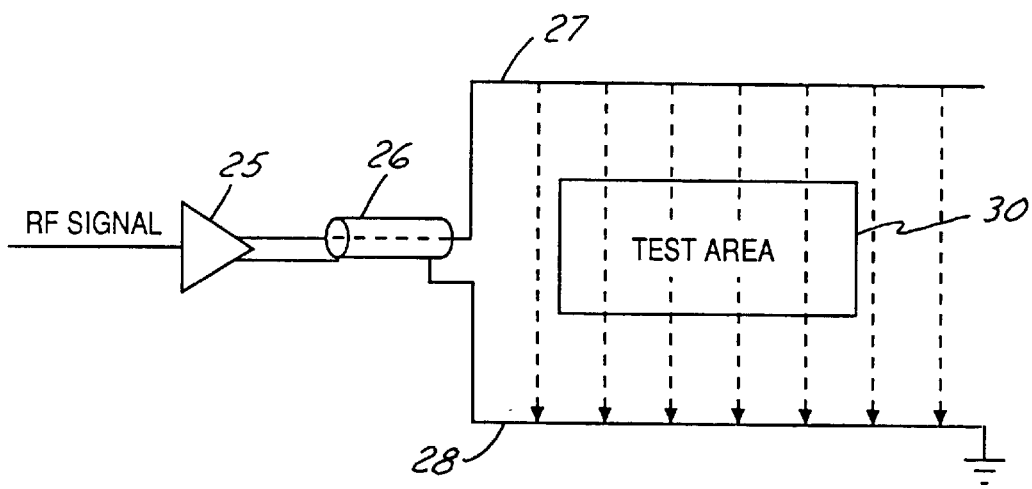
FIG. 2 is a schematic diagram showing the manner of concentrating RF signals employed in the present invention.

The present invention achieves a concentrated and localized electric field to perform radio testing as shown in FIG. 2. An RF signal (e.g., from an external antenna) is provided to an amplifier 25. The amplified RF signals are transmitted through a transmission line 26 to a pair of antenna conductors 27 and 28. Antenna conductors 27 and 28 follow elongated paths which are disposed on opposite sides of a test area 30. The antenna conductors create field emission surfaces similar to plates of a capacitor so that a concentrated RF radio broadcast signal is produced between the emission surfaces. The surfaces may be lines (i.e., the conductors are formed by straight wires) or can be planes if planar conducting surfaces (i.e., flat plates) or grids are employed. Antenna conductors 27 and 28 may preferably be provided above and below the radio test area, although locations on opposite lateral sides of the test area are also acceptable.

Figure 3:
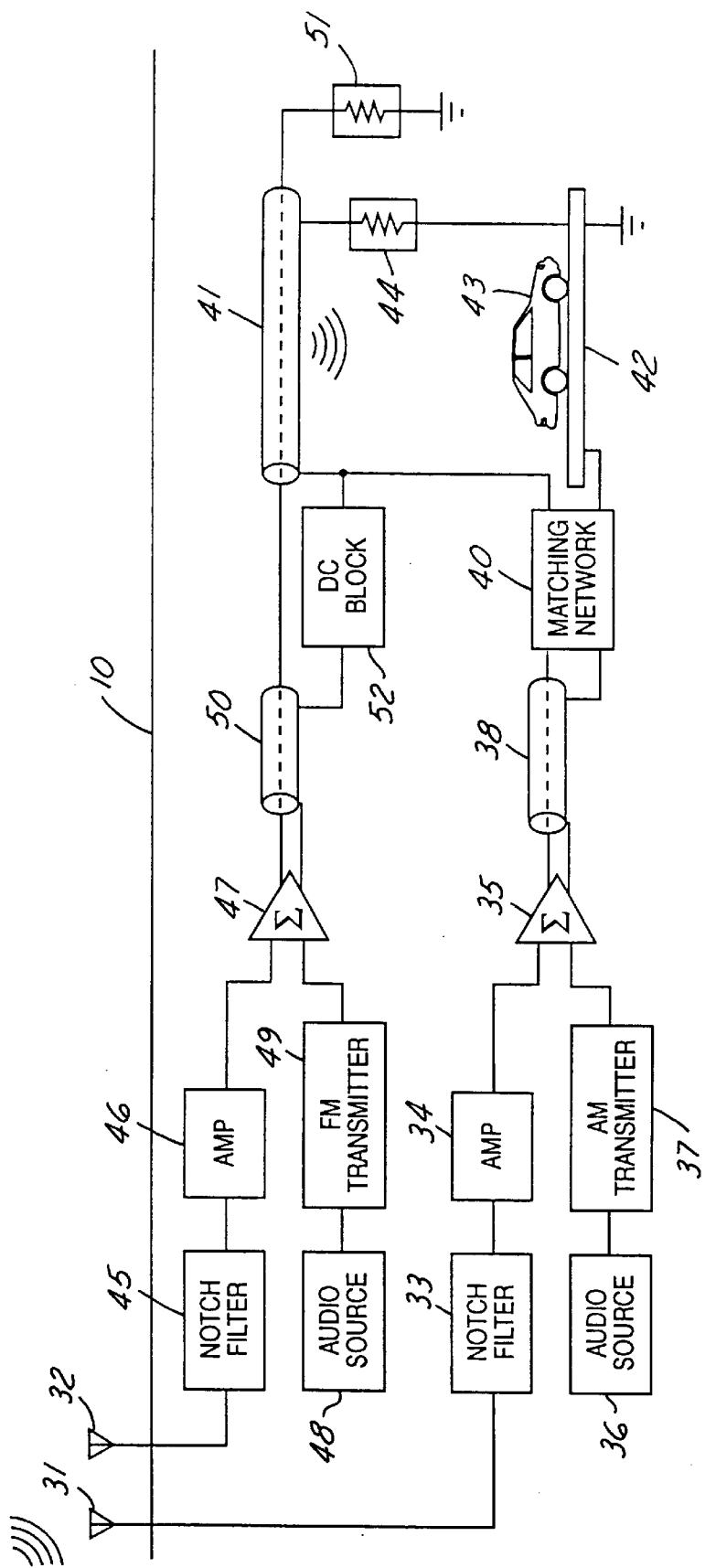
FIG. 3 is a schematic diagram showing a vehicle manufacturing test system in greater detail.

A test system for rebroadcasting AM and FM signals and for broadcasting AM and FM specialized (i.e., dedicated) test signals is shown in FIG. 3. An AM antenna 31 and an FM antenna 32 are located on the exterior of building 10. AM antenna 31 is connected to a notch filter 33 and the filtered AM broadcast signals are amplified in an amplifier 34. The amplified AM signals are coupled to one input of a summing amplifier 35. An audio source 36 such as a compact disc player or a waveform generator generates other test signals which may be used in radio testing and are coupled to an AM transmitter 37 which provides AM broadcast signals to a second input of summing amplifier 35. Audio source 36 may provide special tones, for example, for specialized vehicle testing.

The output of summing amplifier 35 is connected to a coaxial transmission line 38 which transmits the summed AM broadcast signals to the antenna via a matching network 40. Matching network 40 is optional and would be used only if needed to provide sufficient energy coupling to the antenna. For the AM antenna, a first conductor is provided by the shield conductor of a coaxial cable 41. The second antenna conductor is provided by connection to a metallic rail or track structure 42 which is associated with the assembly line along which a vehicle 43 is moving. If necessary, a dummy load 44 may be connected between first and second antenna conductors 41 and 42. Coaxial cable 41 is installed in the ceiling of building 10 directly over rail 42 to create the concentrated AM broadcast signal of the present invention. If a metal rail or track 42 is not available in the radio test area, then a conductor can be laid on or within the floor along the assembly line in the radio test area.

FM broadcast signals picked up by FM antenna 32 are coupled through a notch filter 45 and an amplifier 46 to one input of a summing amplifier 47. In a manner similar to the AM signals, an audio source 48 provides test signals through an FM transmitter 49 to a second input of summing amplifier 47. FM broadcast signals are coupled through a transmission line 50 (typically a coaxial cable) to coaxial cable 41 which acts by itself as a long wire FM broadcast antenna. As is known in the art, a leaky coaxial cable can be employed as the FM antenna 41 (such as Radiax® cable available from Andrew Corporation). If necessary, a dummy load 51 may be connected between the end of coaxial cable 41 and ground.

By employing the shield conductor of coaxial cable 41 as the first antenna conductor for the AM broadcast antenna, the antenna hardware is reduced and installation is made easier. However, to avoid shorting AM signals supplied to the shield conductor to ground through the FM summing amplifier 47, a DC blocking circuit 52 is connected between the shield conductor of coaxial cable 41 and the shield conductor of transmission line 50. DC blocking circuit 52 can simply be comprised of a blocking capacitor.

Coaxial cable 41 is preferably coextensive with the section of rail 42 which is connected as an antenna conductor. Rail 42 also has a ground connection corresponding with the termination of cable 41. Preferably, the length of the two antenna conductors are less than or equal to about ¼ of a wavelength of an AM signal. Restricting the length of the antenna helps maintain field uniformity throughout the radio test area.

Figure 4:
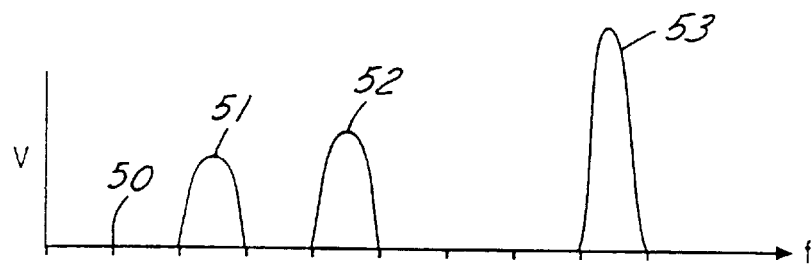
FIG. 4 is a plot showing an example of receivable broadcast signals in a particular region.
Figure 5:
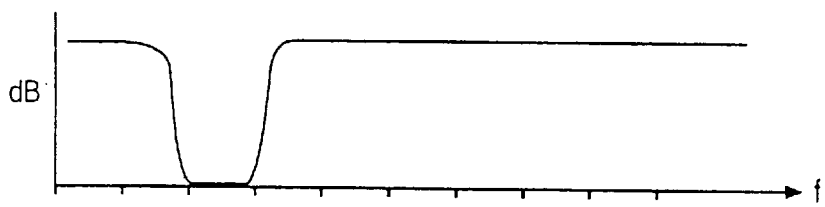
FIG. 5 is a plot showing the frequency response of a notch filter as used in FIG. 3.

The purpose of notch filters 33 and 45 will be described with reference to FIGS. 4 and 5. FIG. 4 shows a typical spectrum within the AM broadcast band wherein the channels of the AM broadcast band are not all used in a particular geographic area. At beginning 50 of the AM broadcast band the first available channel is shown as being unoccupied. The second and forth channels respectively contain AM broadcast signals 51 and 52. A relatively stronger AM broadcast signal 53 is shown occupying a higher frequency channel. If amplifiers 34 and 46 of FIG. 3 were to amplify the entire broadcast bands including all transmissions present, there is a danger that the strongest broadcast signals may overload the amplifiers. Since the antenna connection test is comprised of a scan tune which begins at the beginning 50 of the broadcast band, and since it is desirable to complete the test in the shortest amount of time possible, it is desirable to have sufficient field strength from AM broadcast signal 51 to activate the stop sequence of the scan tune operation. However, if equal amplification of the entire broadcast band is performed, then the amount of amplification of AM signal 51 may be limited because of the presence of AM signal 53 and the rest of the signal in the AM band. To compensate for this, notch filters 33 and 45 are inserted having a characteristic as shown in FIG. 5. In particular, the filter provides a relatively great amount of attenuation except at the frequencies of an acceptable broadcast signal at the low end of the band, such as the second channel in FIG. 4. It may also be desirable to have two notches or a single notch wide enough to pass signals 51 and 52 without attenuation so that the radio will stop at signal 52 in the event that signal 51 were to inadvertently go off the air.

Figure 6:
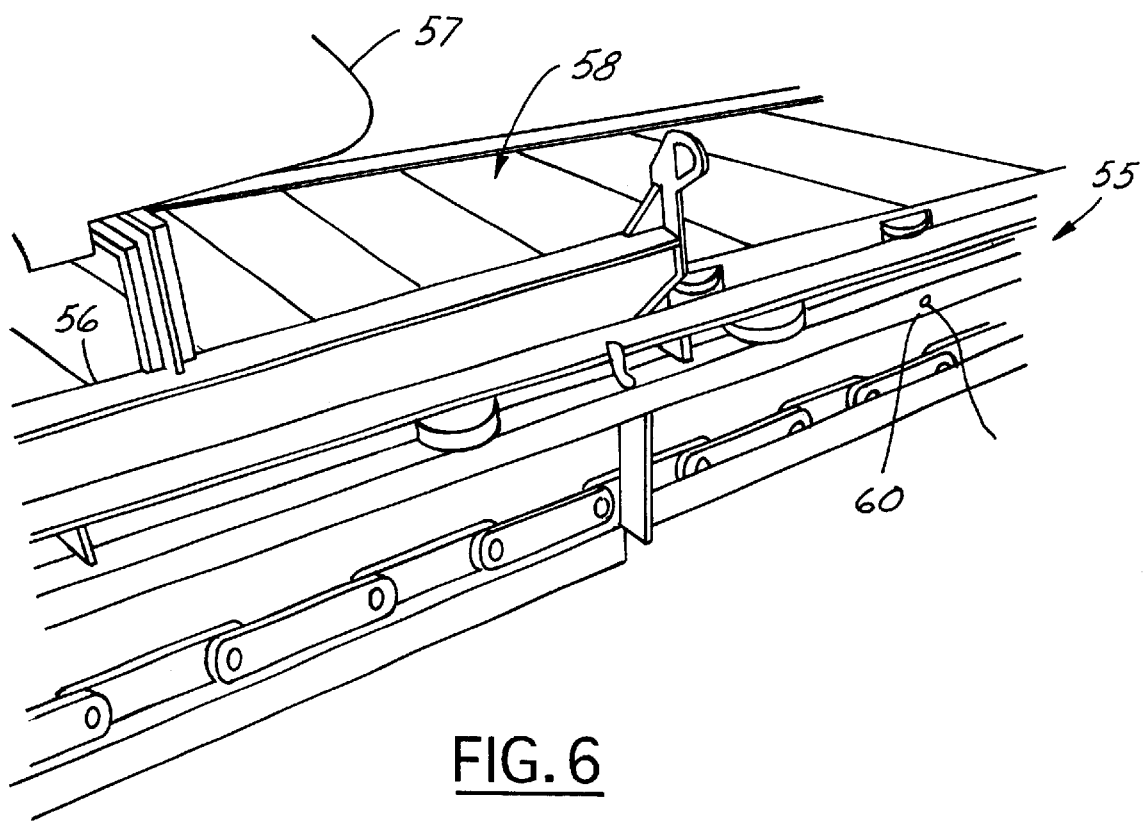
FIG. 6 is a perspective view showing an antenna connection of the present invention to the rail structure in a vehicle assembly plant.
Figure 7:
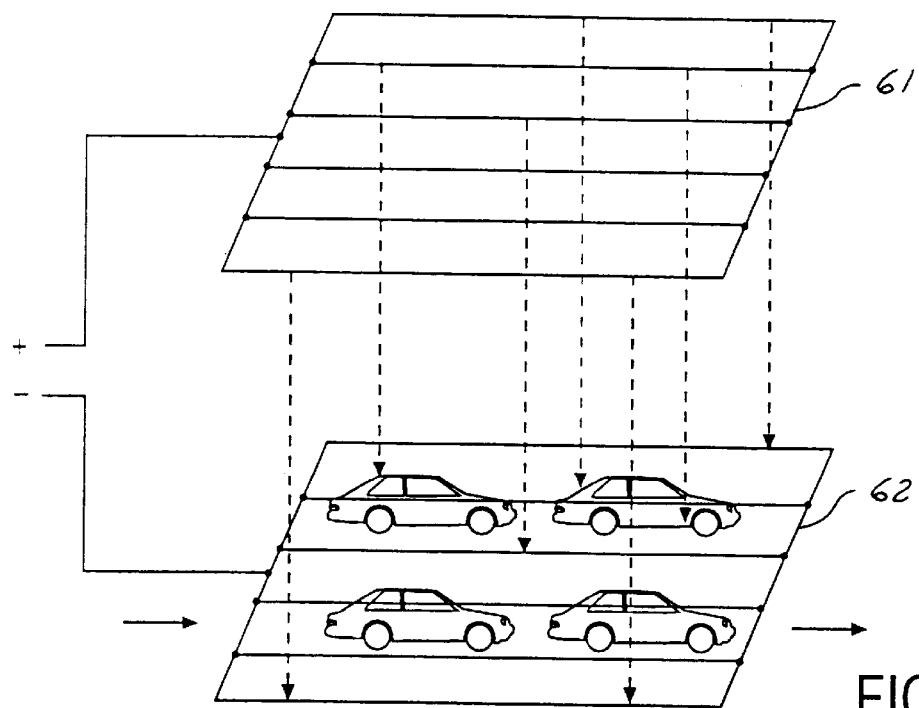
FIG. 7 shows an alternative embodiment for creating a larger test area.

FIG. 6 shows a further embodiment which integrates an antenna conductor with the track system of the assembly line. An elongated rail system 55 supports and pulls a fixture or sled 56 which is attached to a vehicle 57 being assembled. Track 55 may be in contact with a continuous series of metal plates 58 which cover some of the track mechanisms. Track 55 and plates 58 form one continuous electrically conductive structure whereby the emission surface or radiation surface of the antenna conductor is in the form of the plane rather than just a straight line. The antenna connection can be made as shown at point 60 by clipping, screwing, soldering or other electrically conductive means. Two connections are made to track 55 in this same manner to provide both the transmission line and the ground connections.

In a further embodiment of the invention, the radio test area may be made larger (e.g. not restricted to a single-file line) by employing conductive grid structures 61 and 62 for the first and second antenna conductors. Grids 61 and 62 may be constructed of wires or metal pipes and concealed in the ceiling and floor respectively.

Figure 8:
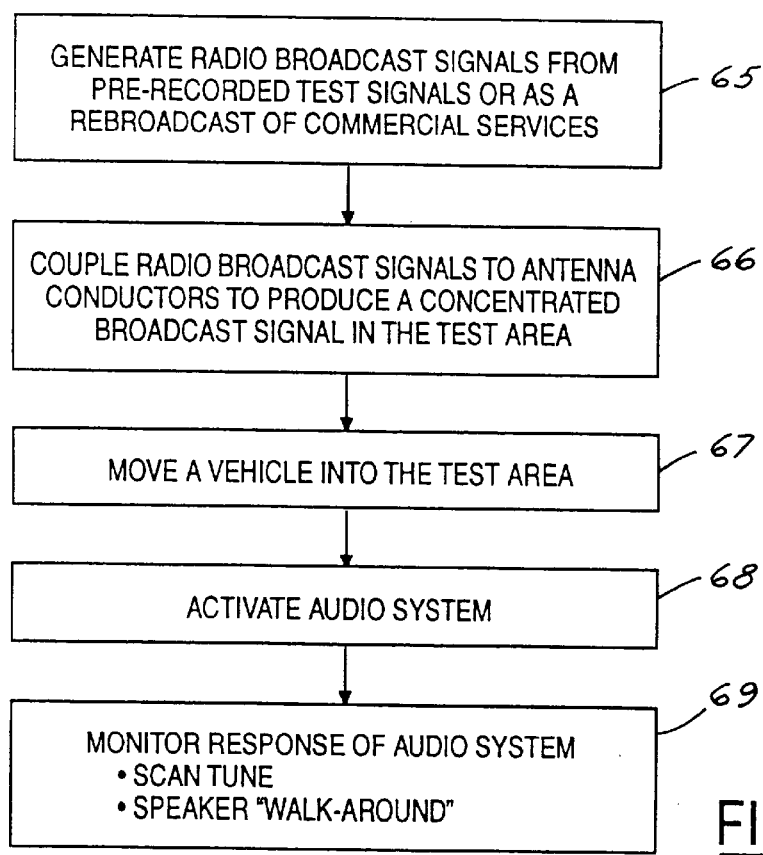
FIG. 8 is a flow chart showing a radio test process using the present invention.

FIG. 8 shows a preferred method for utilizing the antenna of the present invention in vehicle manufacturing. In step 65, radio broadcast signals are generated from prerecorded test signals or as a rebroadcast of commercial services. In step 66, the radio broadcast signals are coupled to the antenna conductors to produce a concentrated broadcast signal in the test area while providing a uniform field intensity along the full length of the antenna. A vehicle having an audio system to be tested is moved into the test area in step 67. In step 68, the audio system is activated either manually or under automatic control. In step 69, the response of the audio system is monitored to various test actions such as a scan tune or a speaker walkaround test.

What is claimed is:

1. A broadcast system for broadcasting amplitude modulated (AM) signals inside a vehicle manufacturing building to a radio test area for testing audio systems in newly manufactured vehicles, said broadcast system comprising:

a first antenna conductor forming a first emission surface along a side of said radio test area;

a second antenna conductor forming a second emission surface along an opposite side of said radio test area; and an AM amplifier coupled across said first and second antenna conductors to produce a concentrated AM radio broadcast signal between said first and second emission surfaces and in said radio test area;

wherein frequency modulated (FM) signals are also broadcast, wherein said broadcast system further includes an FM amplifier and a coaxial cable FM broadcast antenna having a core conductor and a shield conductor coupled to said FM amplifier, and wherein said shield conductor also comprises said first antenna conductor for broadcasting said AM signals.

2. The broadcast system of claim 1 wherein said broadcast system further comprises:

an AM antenna located outside said vehicle manufacturing building and coupled to said AM amplifier for receiving said AM broadcast signals, whereby said first and second antenna conductors rebroadcast said AM broadcast signals to said radio test area.

3. The broadcast system of claim 2 further comprising:

a bandpass filter coupled between said AM antenna and said AM amplifier for selecting one or more AM broadcast stations while attenuating other AM broadcast stations.

4. The broadcast system of claim 1 wherein said first antenna conductor is disposed above vehicles moving through said radio test area, wherein said vehicle manufacturing building includes an elongated metal structure disposed beneath vehicles moving through said radio test area, and wherein said metal structure comprises said second antenna conductor.

\* \* \* \* \*